Figure 1:
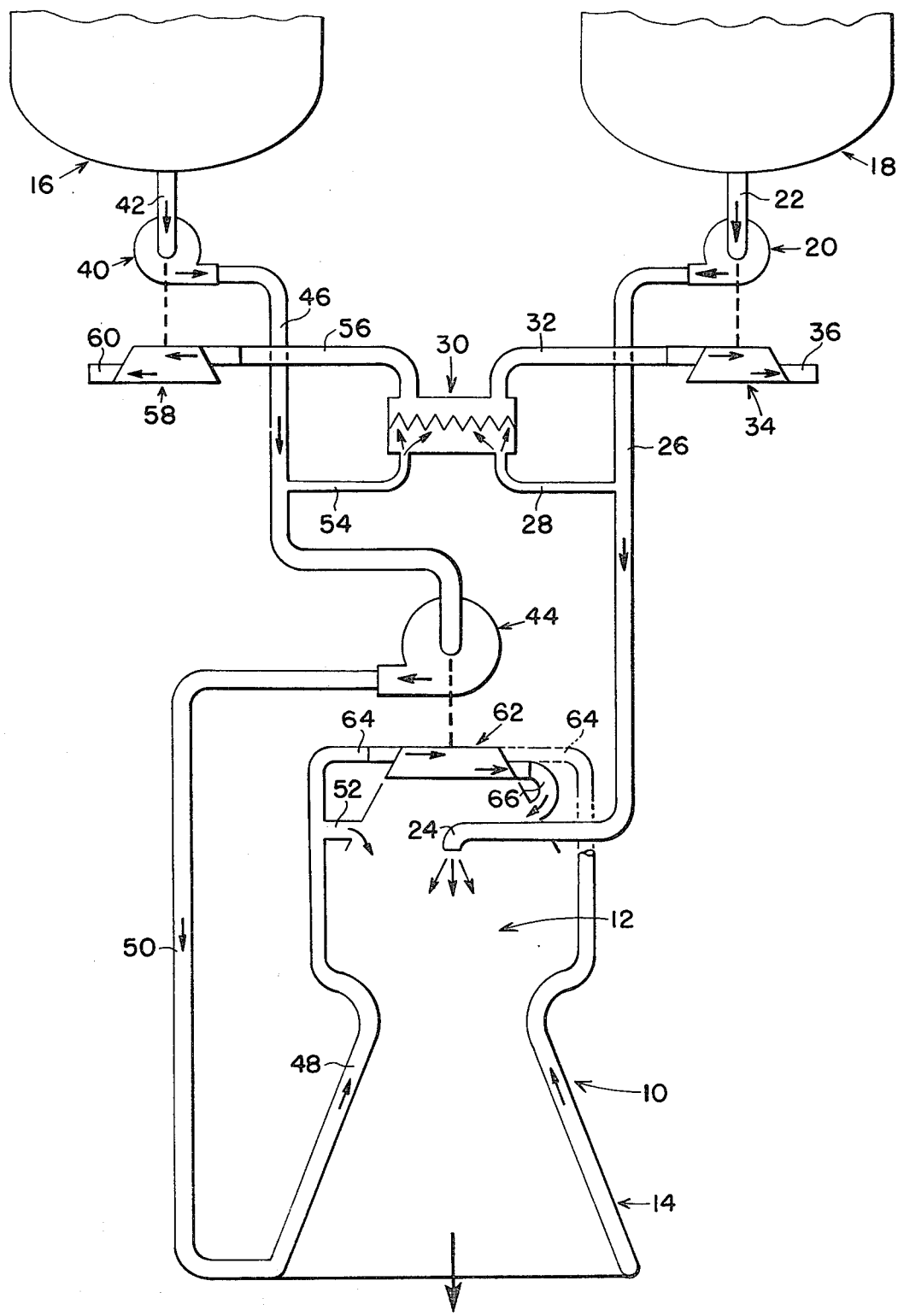

United States Patent [19]
Stewart et al.

[11] 4,171,615
[45] Oct. 23, 1979

[54] SUPERCHARGED TOPPING ROCKET PROPELLANT FEED SYSTEM

[75] Inventors: Warner L. Stewart, Parma Heights; Ambrose Ginsburg, South Euclid; Melvin J. Hartmann, Westlake, all of Ohio

[73] Assignee: The United States of America as represented by the Administrator of the National Aeronautics and Space Administration, Washington, D.C.

[21] Appl. No.: 545,793

[22] Filed: Apr. 21, 1966

[51] Int. Cl.² ............................................. F02K 9/02
[52] U.S. Cl. ..................................... 60/203; 60/259
[58] Field of Search .......... 60/257, 259, 240, 39.46 R, 60/203

[56] References Cited
U.S. PATENT DOCUMENTS

| | | | |
|---|---|---|---|
| 2,625,007 | 1/1953 | Truax | 60/260 |
| 2,816,417 | 12/1957 | Bloomberg | 60/39.32 |
| 3,028,729 | 4/1962 | Ledwith | 60/259 |
| 3,168,807 | 2/1965 | Ledwith et al. | 60/203 |

Primary Examiner—Stephen C. Bentley
Attorney, Agent, or Firm—Gene E. Shook; John R. Manning; Norman T. Musial

[57] ABSTRACT

A rocket propellant feed system utilizing a bleed turbopump to supercharge a topping turbopump. The bleed turbopump is of a low pressure type to meet the cavitation requirements imposed by the propellant storage tanks. The topping turbopump is of a high pressure type and develops 60 to 70 percent of the pressure rise in the propellant.

6 Claims, 2 Drawing Figures

SUPERCHARGED TOPPING ROCKET PROPELLANT FEED SYSTEM

The invention described herein was made by employees of the United States Government and may be manufactured and used by or for the Government for governmental purposes without the payment of any royalties thereon or therefor.

This invention relates to a rocket propellant feed system for advanced chemical or nuclear rocket engines. More particularly, the invention is concerned with a propellant feed system for large high energy chemical rockets where the chamber pressure is high to reduce the thrust chamber size and to increase the nozzle expansion ratio. The invention is also concerned with a propellant feed system for a nuclear rocket engine in which the reactor size is as small as possible for improved nuclear control.

There are several types of conventional propellant feed systems which include straight bleed or gas generator systems and straight topping systems. In the bleed or gas generator system a fraction of the propellant is directed and fed into a gas generator after passing through propellant feed pumps. In a nuclear rocket this propellant is directed to the core of a reactor. The heated gas thus generated then passes through turbines used to drive propellant pumps, and the turbine flow is exhausted overboard.

In the straight topping system the fuel flow, after being pressurized, is heated by either combustion with oxidizer as in a chemical system or through cooling of other engine components as in either a chemical system or a nuclear system. The fuel passes through the turbines which power the pumps where the required energy is extracted and an appropriate pressure drop occurs. From the turbine exhaust the fuel passes into either the thrust chamber or the reactor.

As engine sizes and pressure levels are increased the aforementioned systems become quite marginal or even unacceptable. As the required chamber pressure is raised in a bleed or generator system the amount of flow directed through the turbines increases proportionally. Because this flow bypasses the main chamber a considerable penalty in engine performance will occur. Also, in order to keep the turbine inlet temperatures at a level consistent with stress limitations, a rather large fraction of the fuel must be directed from the main flow system. As chemical engine pressures and thrust levels are increased the oxygen/fuel ratio of the engine is increased to match the corresponding shift in that required for peak impulse and to maintain the required fuel tanks at a reasonable size. These conditions, coupled with the general rise in bleed rate, results in an even larger percentage of fuel flow being directed to the turbines which results in a rather large increase in tankage volume and weight.

In the topping system the energy available to drive the required turbines is derived from the energy within the gas at the turbine inlet and the utilization of this energy through an appropriate pressure drop. As the required chamber pressure levels are increased, the energy required to power the pumps increases proportionately. In the chemical system, even at turbine limiting temperatures, this results in a considerable further increase in required pump pressure rise which aggravates the already serious situation. In nuclear applications, a similar situation exists wherein the turbine inlet temperature is limited to very low values as a result of a desire to obtain required energy through engine component cooling only. Also, with topping complicated and difficult mechanical, packaging, and control problems arise in the chemical system where two turbines must be driven either in series or in parallel by the topping gas flow. Such problems also include complicated ducting of a gas at its highest pressure level.

In either the bleed system or the topping system, as the required pressure level is increased a corresponding increase occurs in already critical hydrodynamic and mechanical problems that occur within the turbopump components. As an example of a hydrodynamic problem, increased pressure levels require considerably more pump staging or stage loading. Also, a high pump pressure rise is not compatible with low net positive suction pressures at the pump inlet, and this greatly aggravates the cavitation problem. Another hydrodynamic problem is that of pump stability caused by the increased pump loading. Among the mechanical difficulties involved is the increase in bearing problems caused by both power and rpm increasing. Mechanical problems of thrust balancing are also encountered, and a difficult problem of critical speed arises.

These problems have been solved by the propellant feed system of the present invention. This system, in contrast with the straight bleed system or the topping system, has two fuel pumps operating in series. The pumping of fuel is the most critical. The second, or high pressure pump, is driven by a topping turbine and develops the major portion of the total fuel pressure rise because it can be designed without compromising the requirements of net positive suction conditions at the pump inlet. This second pump is supercharged by the first pump which is driven by a bleed or gas generator driven turbine. This first pump delivers a much lower percentage of the required pressure rise and is designed to accept the net positive suction pressure condition imposed upon it by the fuel storage tank.

It is, therefore, an object of the present invention to provide a propellant feed system in which the fuel pumping is divided into two parts to use a combined topping and bleed system wherein each pump can be optimized for its specific requirement.

Another object of the invention is to provide a rocket propellant feed system having a minimum bleed rate to reduce the engine performance penalty and associated tank volume.

These and other objects of the invention will be apparent from the specification which follows and from the drawing wherein like numerals are used throughout to identify like parts.

Figure 2:
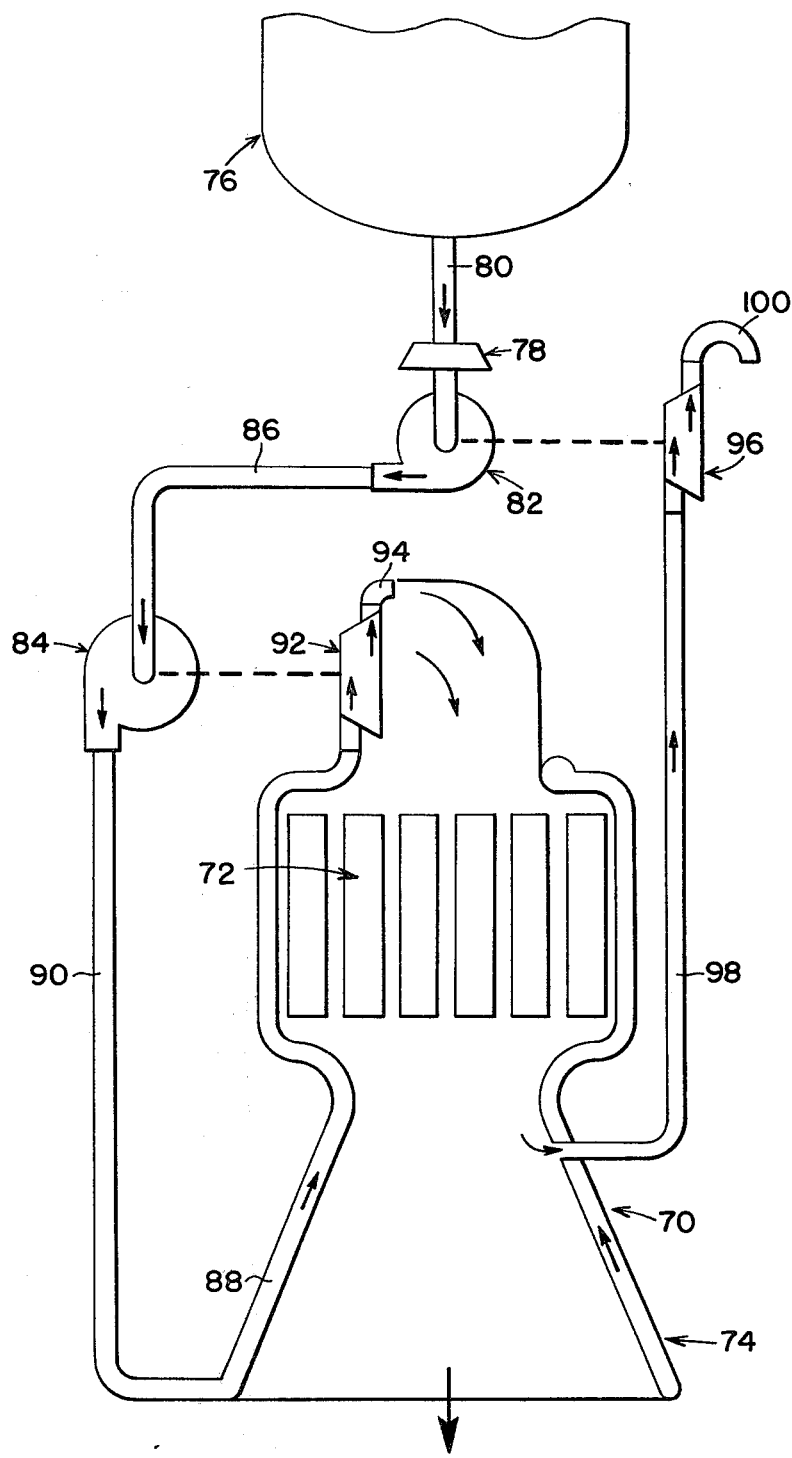

In the drawings:

FIG. 1 is a schematic view illustrating a propellant feed system constructed in accordance with the present invention to be used with a chemical rocket; and FIG. 2 is a schematic view illustrating a propellant feed system constructed in accordance with the invention to be used with a nuclear powered rocket.

Referring now to the drawings, there is shown in FIG. 1 a chemical rocket 10 having a combustion chamber 12 at one end and a convergent-divergent nozzle 14 at the opposite end. Liquid propellants are stored in tanks 16 and 18. By way of illustration, the tank 16 contains a fuel, such as liquid hydrogen, while an oxidizer, such as liquid oxygen, is stored in the tank 18.

These propellants are supplied to the rocket 10 from the tanks 16 and 18 through a propellant feed system illustrated in FIG. 1. Liquid oxygen flows to an oxidizer pump 20 from the tank 18 through an inlet pipe 22. Pressurized liquid oxygen from the pump 20 is supplied to an injector 24 in the rocket combustion chamber 12 through a pressurized outlet pipe 26.

A portion of the pressurized liquid oxygen in the pipe 26 is directed through a bleed line 28 to a gas generator 30 which operates in a conventional manner. Gas from the generator 30 is carried by a line 32 to a turbine 34 which drives the liquid oxygen pressure pump 20. After passing through the turbine 34 the gas is dumped overboard through an exhaust 36.

Liquid hydrogen fuel is supplied to a hydrogen pump 40 through a supply line 42 as shown in the upper left hand portion of FIG. 1. The pressurized liquid hydrogen is transported to the nozzle end of the rocket 10 for regenerative cooling after which it is introduced into the combustion chamber 12. The regenerative cooling is accomplished in a conventional manner, and this cooling forms no part of the present invention.

According to the present invention, a second or high pressure pump 44 is utilized on conjunction with the first pump 40 to pressurize the liquid hydrogen and transport it from the tank 16 to the combustion chamber 12. The first stage pump 40 acts as a supercharger for the second stage pump 44, and the pressurized liquid hydrogen from the first stage pump 40 is transmitted to the second stage pump 44 through a line 44. Liquid hydrogen from the second stage pump 46 is supplied at a high pressure to regenerative cooling tubes 48 around the rocket 10 through a high pressure feed line 50. The liquid hydrogen becomes heated in the regenerative cooling tubes 48, and a portion is discharged into the combustion chamber 12 through a hydrogen injector 52.

A portion of the pressurized liquid hydrogen in the line 46 between the first stage pump 40 and the second stage pump 44 is directed through a bleed line 54 to the gas generator 30. The gas produced by the generator 30 is directed through a gas line 56 to a turbine 58 which drives the first stage hydrogen pump 40. After passing through the turbine 58 the gas is dumped overboard at a discharge 60.

Another important feature of the invention is a provision of a topping turbine 62 which drives the second stage liquid hydrogen pump 44. A portion of the liquid hydrogen in the cooling tubes 48 surrounding the rocket 10 is directed to the topping turbine 62 through ducts 64. After passing through the topping turbine 62 the gaseous hydrogen leaves through a discharge line 66 and is directed into the combustion chamber 12.

By utilizing the supercharged topping feed system of the present invention instead of the straight bleed or topping systems, the critical fuel pumping operation is divided into two pumps operating in series. The second, or high pressure, pump 44 develops 60 to 70 percent of the total pressure rise because it can be designed without the compramising requirements of net positive suction conditions at the pump inlet. In this manner, the pump 44 is supercharged by the first pump 40 which is driven by the bleed or gas generator drive turbine 58. The pump 40 delivers between 30 to 40 percent of the required pressure rise and is designed to accept the net positive suction conditions imposed on it by the tank 16.

The utilization of the turbopumps 40 and 44 in a supercharging manner to pressurize the hydrogen from the tank 16 reduces the required bleed rate to the lines 28 and 54 from that of a conventional bleed system. This, in turn, greatly reduces the attendant engine performance penalty and reduces the associated tank volume and weight problems.

Another feature of the invention is that the power required of the topping turbine 62 is reduced considerably from that required for a straight topping system. Therefore, the required pressure drop across the turbine 62 is drastically reduced which, in turn, lowers the overall pump pressure rise.

The use of a gas generator 30 to power the drive turbine 58 for the supercharger pump 40 and the turbine 34 for the oxidizer pump 20 enables only one turbine 62 to be driven in a topping fashion thereby eliminating many of the mechanical, packaging, and control problems associated with additional turbines in the topping portion of the cycle. It is contemplated that the turbines 34 and 58 may be powered in series by the gas generator 30.

As the pressure required by the rocket 10 and the combustion chamber 12 increases, the two fuel pumps 40 and 44 can accommodate additional staging much more efficiently than the single pumps utilized by the prior art. Each pump 40 and 44 can be optimized for its specific requirements. The topping driven pump 44 can be optimized for pressure production without consideration of cavitation. The supercharger pump 40, which is now a rather low pressure producing pump, can be optimized to meet the cavitation requirements imposed upon it by the tank 16, either through appropriate design of the pump itself, or under more severe conditions, by the incorporation of a geared, hydraulic, or gas driven boost pump stage. Inasmuch as each pump 40 and 44 can be loaded to a smaller extent, the stability problems are reduced. Also, the three major mechanical problems of bearing, thrust, and critical speed are greatly reduced because each turbine pump unit is much more conservative.

Referring now to FIG. 2, there is shown a nuclear powered rocket 70 having a nuclear reactor 72 for heating the propellant and a convergent-divergent nozzle 74. A propellant, such as liquid hydrogen, stored in a tank 76 is supplied to the rocket 70 through a propellant feed system embodying the features of the present invention. Liquid hydrogen in the tank 76 at a pressure of about 30 psia is fed to a geared inducer 78 through a propellant feed line 80. The liquid hydrogen leaves the inducer and enters a supercharger pump 82 which raises its pressure to about 630 psia.

This pressurized liquid hydrogen is fed to a main pump 84 at the pressure of 630 psia through the high pressure line 86. The main pump 84 raises the pressure of the liquid hydrogen to 1680 psia and feeds this pressurized propellant to regenerative cooling tubes 88 around the rocket 70 through a line 90.

The hydrogen in the cooling tubes 88 is heated to a temperature of 300° R and is fed into a topping turbine 92 at pressure of 1430 psia. About 20 percent of the hydrogen fuel is bypassed around the turbine 92. The hydrogen leaves the topping turbine 92 at a discharge 94 and is fed to the core of the nuclear reactor 72. At the intake side of the core 72 the hydrogen has a pressure of 1000 psia and at the discharge side of the core adjacent the nozzle 74 the hydrogen is at a pressure of 800 psia.

Hydrogen at a temperature of 1500° R is fed to a bleed turbine 96 through a bleed line 98. The bleed rate is about 3 percent. The bleed turbine 96 drives the supercharger pump 92. After passing through the bleed turbine 96 the gaseous hydrogen is discharged overboard through a discharge 100.

All of the aforementioned pressures and temperatures are given by way of illustration and not by way of limitation. By using the feed system of the present invention with the nuclear rocket 70 the reduced energy required permits the topping turbine 92 to operate with reasonable pressure drops under the temperature restrictions providing the system with some margin.

While several embodiments of the invention have been shown and described, it will be appreciated that various structural modifications may be made without departing from the spirit of the invention or the scope of the subjoined claims.

What is claimed is:

1. A feed system for supplying a liquid propellant from a storage tank to a rocket engine comprising
    a first pump having an inlet thereof connected to the storage tank and an outlet directed toward the rocket engine,
    a second pump having an inlet thereof connected to the outlet of said first pump so that said first pump supercharges said second pump, said second pump having an outlet in communication with the rocket engine,
    a bleed turbine for driving said first pump,
    means for removing a portion of the propellant from said feed system to drive said bleed turbine,
    a topping turbine for driving said second pump,
    means for directing a portion of the propellant from said feed system through said topping turbine for driving the same, and
    means for directing said last named portion of the propellant to said rocket engine after passing through said topping turbine.

2. A feed system as claimed in claim 1 wherein the pressure of the liquid propellant is raised by both the pumps and the second pump delivers a major portion of the pressure rise,
    said first pump being adapted to accommodate a net positive suction pressure condition imposed upon it by the storage tank.

3. A feed system as claimed in claim 1 wherein the rocket engine is of the chemical type having a combustion chamber at one end and a convergent-divergent nozzle at the opposite end for receiving fuel and oxidant from a pair of propellant storage tanks,
    the first and second pumps being connected to the fuel storage tank,
    another pump connected to the oxidant storage tank,
    a gas generator connected to the bleed turbine for driving the first pump,
    means for directing a portion of the fuel and oxidant from the outlets of the first pump and other pump to said gas generator,
    means for directing pressurized fuel from the outlet of second pump to regenerative cooling tubes about said rocket engine, and
    means for directing a portion of the fuel from the cooling tubes through the topping turbine.

4. A feed system as claimed in claim 3 including another bleed turbine for driving the other pump for pumping the oxidant.

5. A feed system as claimed in claim 1 wherein the rocket engine is of the nuclear type having a reactor core at one end and a convergent-divergent nozzle at the opposite end,
    means for directing pressurized propellant from the outlet of the second pump to regenerative cooling tubes about said convergent-divergent nozzle, and
    means for directing said propellant from said cooling tubes to the topping turbine.

6. A feed system as claimed in claim 5 including means for directing a portion of the gaseous propellant in the convergent-divergent nozzle to the bleed turbine.

* * * * *